United States Patent
Florit et al.

(10) Patent No.: US 7,911,938 B2
(45) Date of Patent: Mar. 22, 2011

(54) SYSTEM AND METHOD FOR PREVENTING LOOPS IN THE PRESENCE OF CONTROL PLANE FAILURES

(75) Inventors: Lionel Florit, Greenbrae, CA (US); Robert W. Klessig, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 803 days.

(21) Appl. No.: 11/336,704

(22) Filed: Jan. 20, 2006

(65) Prior Publication Data
US 2007/0171814 A1    Jul. 26, 2007

(51) Int. Cl.
*H04J 1/16*    (2006.01)
(52) U.S. Cl. ........................................ 370/216
(58) Field of Classification Search ............... 370/216, 370/222, 256
See application file for complete search history.

(56) References Cited

U.S. PATENT DOCUMENTS

| | | | |
|---|---|---|---|
| 6,081,512 A * | 6/2000 | Muller et al. | 370/256 |
| 6,766,482 B1 * | 7/2004 | Yip et al. | 714/717 |
| 7,463,591 B1 * | 12/2008 | Kompella et al. | 370/248 |
| 2004/0105455 A1 | 6/2004 | Seaman | 370/423 |
| 2004/0223503 A1 * | 11/2004 | Lynch et al. | 370/404 |
| 2005/0201409 A1 * | 9/2005 | Griswold et al. | 370/445 |
| 2005/0249123 A1 | 11/2005 | Finn | 370/242 |
| 2006/0013141 A1 | 1/2006 | Mutoh et al. | 370/241 |
| 2006/0045021 A1 | 3/2006 | Deragon et al. | 370/249 |
| 2007/0041373 A1 * | 2/2007 | Lor et al. | 370/356 |

FOREIGN PATENT DOCUMENTS
WO    WO 03/077459 A2    9/2003

* cited by examiner

*Primary Examiner* — Derrick W Ferris
*Assistant Examiner* — Mohammad Anwar
(74) *Attorney, Agent, or Firm* — Campbell Stephenson LLP

(57) ABSTRACT

Various systems and methods for preventing loops in the presence of control plane failures are disclosed. For example, one method involves sending a special data packet in response to detection of a break in a network loop and then unblocking a port if the special data packet fails to circumnavigate the network loop. Prior to detection of the break, the port was blocked by a loop prevention protocol, such as a spanning tree protocol. If the special data packet successfully circumnavigates the network loop, the port will not be unblocked.

15 Claims, 6 Drawing Sheets

SYSTEM AND METHOD FOR PREVENTING LOOPS IN THE PRESENCE OF CONTROL PLANE FAILURES

FIELD OF THE INVENTION

This invention relates to networking and, more particularly, to preventing loops within a network.

DESCRIPTION OF THE RELATED ART

Various protocols, such as Spanning Tree Protocol (STP), have been developed to prevent network loops. Often, conventional loop prevention protocols circulate control packets in order to detect whether loops are present. For example, a control packet can be sent out into the network, and if the control packet is returned to the sending device within a timeout period, the sending device determines that a loop is present. When a loop is detected, the conventional loop prevention protocol blocks one or more ports in order to break the loop. If no loop is detected, the ports are unblocked.

In some systems that use control packets for loop detection, the control plane is not perfectly aligned with the data plane. In other words, control packets may be handled somewhat differently by network devices within the network, and as a result, disruptions that affect the transmission of control packets may not affect the transmission of data packets. Accordingly, if a disruption occurs in the control plane, the data plane may not actually be affected by the disruption. This can lead to scenarios in which a conventional loop prevention protocol detects that a loop is no longer present, due to a disruption in the control plane, even though a data plane loop is still present. Conventional loop prevention protocols may not detect that the data plane loop is still present in such a scenario and may consequentially operate incorrectly. For example, a control plane disruption may cause some conventional protocols to determine that a loop is no longer present and consequentially unblock a port. This may in turn create a data loop which will, at best, unnecessarily consume network resources and, at worst, render the network unusable. Thus, new techniques for determining whether a data loop is present are desired.

BRIEF DESCRIPTION OF THE DRAWINGS

A more complete understanding of the present invention may be acquired by referring to the following description and the accompanying drawings, in which like reference numbers indicate like features.

Figure 1:
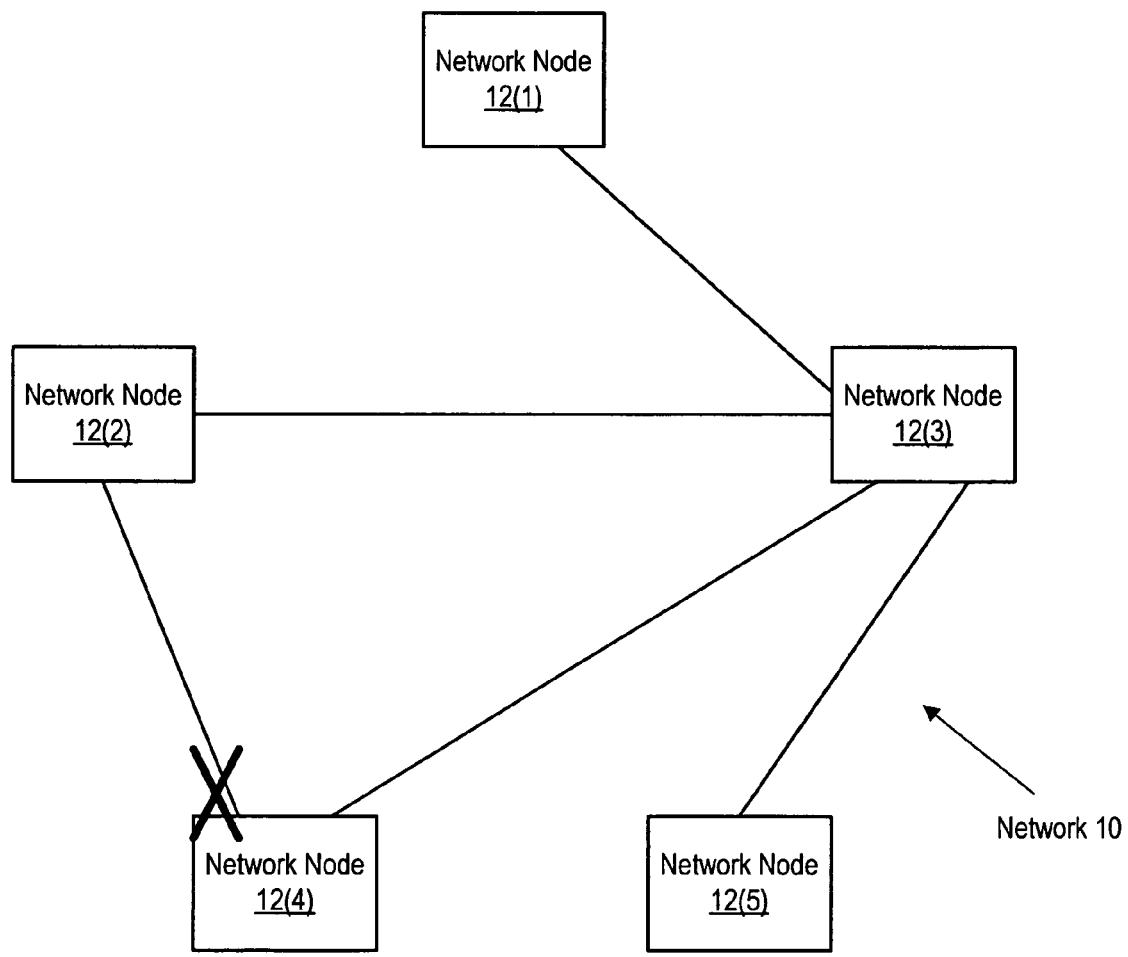
FIG. 1 shows an example of a network that includes a potential data loop, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 shows a block diagram of a network 10 that includes a potential data loop. As shown, network 10 includes network nodes 12(1), 12(2), 12(3), 12(4), and 12(5). Network node 12(1) is coupled to network node 12(3). Network node 12(3) is also coupled to network nodes 12(2), 12(4), and 12(5). Network node 12(2) is also coupled to network node 12(4). Each network node 12(1)-12(5) is a device such as a router or switch that performs packet forwarding and/or routing. Each interconnection between the network nodes can be a physical or logical link, or even another network (e.g., having a ring, mesh, star, or tree topology).

Each network node 12(1)-12(5) implements a loop prevention protocol. For example, each node can implement a spanning tree protocol. Throughout this document, the term "loop prevention protocol" is used to generically refer to any network protocol that prevents data loops within a network. Examples of such protocols include spanning tree protocols, which operate by defining a tree that spans all network devices within the network, as well as protocols such as Rapid Ring Recovery (RRR), available from Cisco Systems of San Jose, Calif. As used herein, the term "spanning tree protocol" can be used to describe network protocols implemented according to IEEE Standards 802.1D, 802.1q, 801.2s, and 802.1w. Similarly, the term "spanning tree protocol" can be used to describe Rapid Spanning Tree Protocol (RSTP), Multiple Spanning Tree Protocol (MSTP), per Virtual Local Area Network (VLAN) Spanning Tree (PVST and PVST+) and per VLAN rapid spanning tree (PVRST and PVRST+).

The loop prevention protocol detects that a loop exists between network nodes 12(2), 12(3), and 12(4). In order to prevent data traffic from being sent via this loop, the loop prevention protocol selects a port to block. In this example, the port within network node 12(4) that is coupled to network node 12(2) is blocked, as indicated by the large "X". When blocked, the port will no longer send or receive data packets. Thus, by blocking one of the ports in the loop, the loop prevention protocol prevents data traffic from being sent around the loop.

Since the network topology may change over time (e.g., due to device and/or link failures, replacements, additions, and the like), the loop prevention protocol continues to monitor the network topology in order to detect additional loops that may arise. The loop prevention protocol can also detect topology changes that break an existing loop. If an existing loop is broken, the loop prevention protocol can "unblock" the port that was blocked. For example, if the link between network nodes 12(3) and 12(4) fails, the loop prevention protocol can detect that there is no longer a loop and unblock the port within network node 12(4) that is coupled to network node 12(2).

The loop prevention protocol can monitor the network topology (in order to detect the presence or absence of network loops) by sending control packets through the network. For example, if a spanning tree protocol is being used, Bridge Protocol Data Units (BPDUs) can be sent. If a control packet successfully travels or is relayed around a network loop (a packet is considered to have successfully circumnavigated a network loop if the packet travels or is relayed successfully around the loop), the loop prevention protocol detects the loop's presence. For example, if the loop prevention protocol causes a control packet to be sent by a network node, and that control packet is later received by the network node that originally sent the control packet, the packet's reception indicates that a loop is present within the network. If a control packet is unsuccessful in traveling or being relayed around the loop (e.g., if a control packet is dropped or otherwise lost before being returned to the sending network node), the loop prevention protocol detects that a loop is not (or is no longer) present.

In certain situations, transient network disruptions may cause a control packet to be lost even though a data loop is still present in the network. Unblocking the blocked port in such a situation would therefore unintentionally create a data loop.

In some embodiments, network nodes 12(1)-12(5) may handle routing and/or forwarding of control packets somewhat differently than routing and/or forwarding of data packets. For example, in certain multi-protocol label switching implementations, spanning tree protocol is implemented on a different path than the paths used to convey data traffic. As a result, the control plane (the portion of network 10 that is used to send and receive control traffic) may not be identical to the data plane (the portion of network 10 that is used to send and receive data traffic). Because of this discrepancy between the control and data planes, the fact that a control loop is no longer present does not necessarily mean that the corresponding data loop is no longer present. Other situations in which there are discrepancies between the control plane and data plane occur when, for example, layer 2 (L2) network techniques are implemented over an Internet Protocol network (where data packets are forwarded after normal IP traffic processing but control packets used to implement the L2 functionality undergo additional special processing before being forwarded), as well as when processor interrupts are used to handle received control, but not data, packets (in this situation, processor failure will disrupt control traffic but not data traffic).

For example, network node 12(2) may lose the ability to process control packets (in particular, network node 12(2) may lose the ability to process loop prevention protocol control packets). However, network node 12(2) is still able to forward data packets normally. A network device that operates in such a manner is often informally referred to by those of skill in the art as being "brain dead." As a result of network node 12(2) being "brain dead," when the loop prevention protocol attempts to send a control packet around the network loop formed between network nodes 12(2), 12(3), and 12(4), the control packet will be dropped by network node 12(2). In a conventional system, this causes the loop prevention protocol to determine that the network loop is no longer present and consequentially unblock the port of network node 12(4). However, since network node 12(2) is still able to forward data traffic, unblocking that port would result in the unintentional creation of a data traffic loop.

In order to avoid situations in which a data traffic loop is unintentionally created due to a port being unblocked, the nodes used in the network of FIG. 1 are configured to check for the presence of a data loop before unblocking a previously-blocked port. Thus, when the control packet being sent or relayed around the loop formed by network nodes 12(2), 12(3), and 12(4) is dropped (due to network node 12(2) being "brain dead"), one or more of the nodes operating in network 10 will check for a data loop between network nodes 12(2), 12(3), and 12(4) before unblocking the currently-blocked port of network node 12(4). If the data loop is still present (as is the case when network node 12(2) is "brain dead" or when transient disruptions occurred), the unblocking of the blocked port within network node 12(4) will be prevented.

In some embodiments, this functionality (the ability to use a special data packet to verify that a loop no longer exists, and to prevent a blocked port from unblocking if the loop is determined to still exist) is included within a loop prevention protocol (e.g., such a protocol can include conventional loop prevention functionality, such as that provided by an existing spanning tree protocol, as well as the functionality described herein). In other embodiments, this functionality is implemented separately from the loop prevention protocol. For example, the functionality can be implemented by a control module within each node. Such a control module can also implement the loop prevention protocol being used to block the port.

A data loop can be detected by causing a network device to attempt to send a special data packet around the loop. In many embodiments, the originating network device (the device that generates and sends the special data packet) is the same network device that includes the blocked port. The special data packet is "special" in that it is handled in a special manner by the originating network device. The special data packet will be treated as an ordinary data packet by all network devices other than the originating network device. The originating network device treats the special data packet in a "special" manner by allowing the special data packet to be sent from and/or received by the blocked port and/or by handling the special data packet in a manner that is more typical of control packet handling. In particular, based on whether the special data packet is received by the originating device within a timeout period, the originating network device will make a control decision to either allow the blocked port to be unblocked (if the special data packet is not received within the timeout period) or to prevent the blocked port from being unblocked (if the special data packet is received).

If the special data packet is successfully conveyed around the loop, the loop is still present (at least for data traffic), and thus the port will not be unblock. If the data packet is not successfully conveyed around the loop (e.g., if the data packet is not returned to the sending network device within a timeout period), the loop is no longer present and the port will be unblocked. Thus, the port will continue to be blocked if a data loop is still present.

As described above, the special data packet is used in situations in which a previously-detected network loop appears to no longer be present. The special data packet is addressed and/or sent in such a manner that the receipt of the special data packet by the originating device indicates that the network loop is still present. For example, as noted above, the special data packet can be from the network device that includes the port that is being blocked to prevent the network loop. Similarly, the destination address of the special data packet can be selected to ensure that the special data packet is conveyed via the network loop. For example, in a ring network (or any other network where the topology that causes the loop is known), the special data packet can be addressed to the port that was blocked to prevent the network loop. As another example within a ring network, the special data packet can be sent from the blocked port of the originating network device and addressed to another ring port within the originating network device.

As another alternative, the destination address of the special data packet can be selected to be an unknown media access control (MAC) address (an address that has not previously been handled by any network device in the network) or a broadcast address, so that each network device will flood the special packet from all ports (other than the receiving port). This behavior causes the packet to be flooded throughout the network. If the packet is forwarded back to the originating network device, a data loop is still present within the network.

As used herein, the term "packet" is used to refer to a logical grouping of information sent as a data unit over a transmission medium. Interpreted in this manner, the term "packet" may include header and/or trailer information that surrounds user data contained in the data unit. Thus, for purposes of this disclosure, a "packet" may include a cell, datagram, frame, message, segment, or any other logical group of information.

Figure 2:
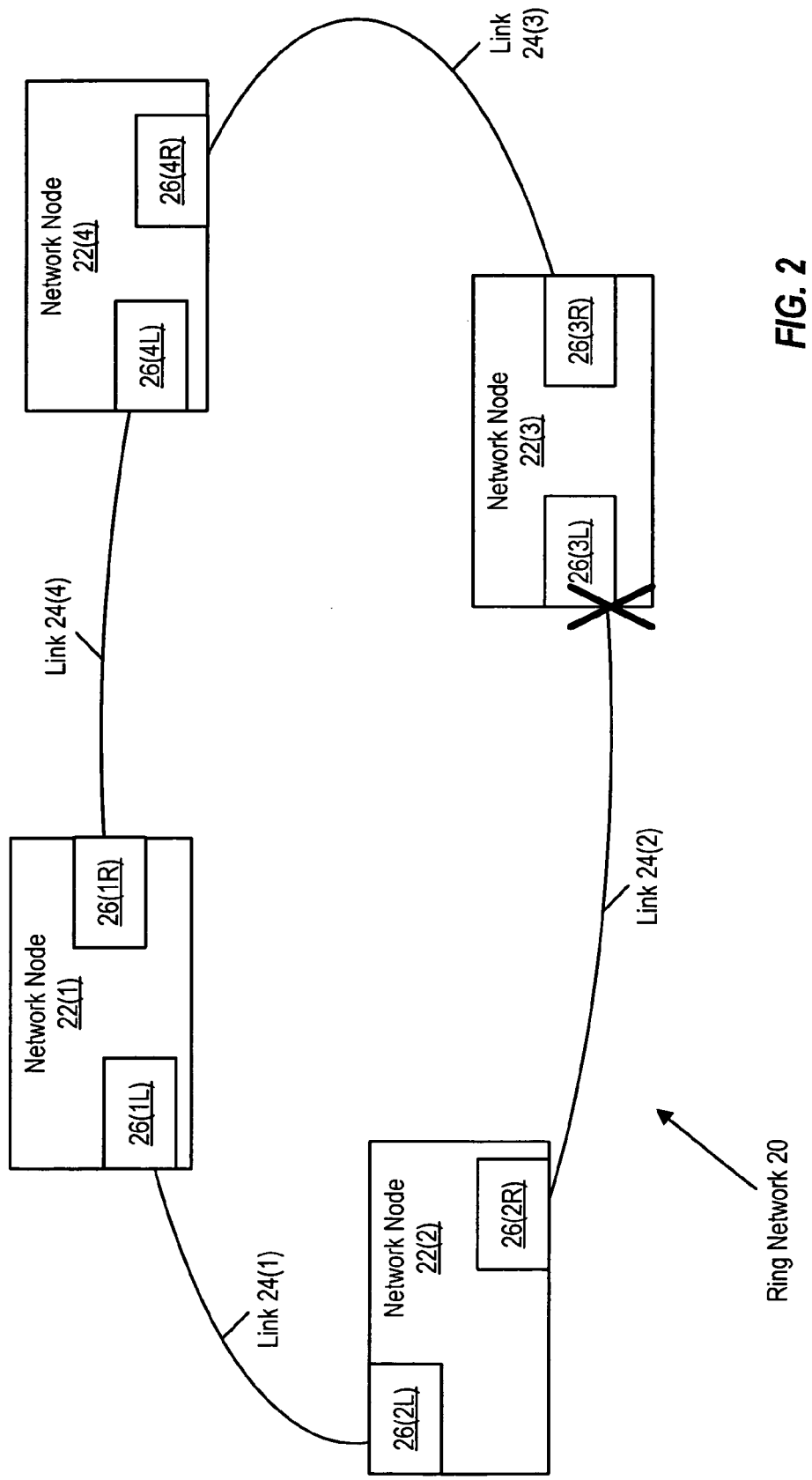
FIG. 2 is a block diagram of a ring network, according to one embodiment of the present invention.

FIG. 2 shows an example of a ring network. As shown, ring 20 includes network nodes 22(1), 22(2), 22(3), and 22(4) as well as links 24(1), 24(2), 24(3), and 24(4). In the illustrated embodiment, each link 24(1)-24(4) is a physical or logical link (e.g., an aggregated link such as an Ether Channel); however, it is noted that in alternative embodiments, various other types of connections can be used to interconnect network nodes. For example, another network (e.g., having a ring, mesh, star, or tree topology) can be used to link two of the network nodes. Additionally, while ring 20 is shown as a complete ring in FIG. 2, the techniques described herein can also be used in an incomplete ring (e.g., a daisy chain).

Like the network nodes of FIG. 1, network nodes 22(1)-22(4) are network devices such as switches, routers, and/or bridges that perform switching, routing, and/or bridging of packets. In one embodiment, network nodes 22(1)-22(4) perform Ethernet switching. Network nodes 22(1)-22(4) can act as part of an access network that provides customers and/or end-users with access to a network (e.g., the Internet). In such a situation, one or more of the network nodes can be coupled to customer devices (e.g., routers and/or switches) and/or end-user devices such as hosts. Additionally, network nodes 22(1)-22(4) can be coupled to network equipment that interconnects one or more access networks with a larger network.

Each link 24(1)-24(4) provides bidirectional communication between a pair of network nodes. For example, link 24(1) conveys packets between network nodes 22(1) and 22(2). Similarly, link 24(2) conveys packets between network nodes 22(2) and 22(3), and link 24(3) conveys packets between network nodes 22(3) and 22(4). Link 24(4) conveys packets between network nodes 22(1) and 22(4).

To facilitate communication via ring 20, network nodes 22(1)-22(4) implement a ring protocol, such as Rapid Ring Recovery (RRR). Such a ring protocol is implemented by exchanging ring protocol control packets between network nodes within the ring. These ring protocol control packets are used to detect continuity and connectivity within the ring as well as to detect failures within the ring. Ring behavior can be modified when failures are detected.

Ring topology networks can be used within networks that are implemented using packet-based transport technologies. However, there are several situations involving ring topologies in which packet forwarding loops can arise. First, the ring itself forms a loop, and thus some sort of protocol must be employed to block this loop. Additionally, when several rings are connected, one or more switches are often included at the connection point in order to increase redundancy. The use of redundant switches potentially creates additional loops.

In embodiments implementing RRR, the RRR ring protocol logically breaks the loop formed within ring 20. In other words, the RRR ring protocol causes ring 20 to behave as if there is a communication break within ring 20, making it unnecessary to implement another loop prevention protocol (such as spanning tree protocol) to break the loop within the ring. The RRR ring protocol causes this behavior by blocking data traffic at one or more points within the ring (e.g., in one embodiment, the protocol blocks all data traffic at one point within the ring; in another embodiment, the protocol blocks data traffic in different VLANs at different points within the ring). In one embodiment, the RRR ring protocol exchanges ring protocol control packets among nodes in order to select a "designated port", to block the designated port when the loop is complete, and to unblock the designated port in response to detecting a failure within the ring. Before unblocking the designated port in response to a failure detected through the use of ring protocol control packets, however, the RRR protocol sends a special data packet around the ring. If the data packet does not successfully travel around the ring the network device that originated it, the RRR protocol determines that a data loop does not exist and unblocks the designated port.

Each network node includes two ring ports that are configured to operate as part of ring 20 (it is noted that each network node can also include other ring ports that are part of another ring network). A ring port is an interface that is coupled to a link (physical or logical) and configured to send ring protocol control packets. Normally, a network node includes a pair of ring ports for each ring in which the network node participates. As shown in FIG. 2, each network node includes a left (L) and a right (R) ring port: network node 22(1) includes ring ports 26(1L) and 26(1R); network node 22(2) includes ring ports 26(2L) and 26(2R); network node 22(3) includes ring ports 26(3L) and 26(3R); and network node 22(4) includes ring ports 26(4L) and 26(4R).

Data packets that are received on one ring port and that are not destined for the receiving network node (packets destined for the receiving network node are being sent to the receiving network node or a device that accesses the ring network via the receiving network node) can be relayed via the other ring port in the pair. For example, if network node 22(1) receives a data packet (i.e., a non-ring protocol control packet) via port 26(1R), and if the packet is not destined for network node 22(1), network node 22(1) can output that packet from port 26(1L). A data packet can also be destined to both the receiving network node as well as other network nodes, e.g., a broadcast packet. In this case, the receiving network node keeps a copy for itself and also sends a copy out via the other ring port in the pair.

Ring protocol control packets are detected by ring ports and processed by the network node. For example, in response to receiving a ring protocol control packet via port 26(1L), ring port 26(1L) can generate an interrupt that causes a processor within network node 22(1) to handle the ring protocol control packet. In response to processing a ring protocol control packet, the network node can generate another ring protocol control packet, which may simply be a copy of the received ring protocol control packet, to send from the receiving ring port (e.g., in response to the ring protocol control packet) or from the paired ring port (e.g., if the ring protocol control packet is being sent around the ring).

The processing that occurs when a ring protocol control packet is received is not performed for many (or even all) of the data packets that may be received by network nodes within ring 20. If a network node experiences a failure that prevents the network node from properly processing ring protocol control packets, that network node may nevertheless continue to process data packets. Accordingly, ring network 20 is an example of a network in which the control plane differs from the data plane.

As noted above, the loop prevention protocol (RRR, in this example) in use within ring network 20 detects whether loops are present by sending control packets. If ring port 26(3L) is selected as the designated port and consequentially blocked (as indicated by the "X" in FIG. 2), the RRR protocol can periodically cause ring port 26(3L) to send a ring protocol control packet on link 24(2). If each ring protocol control packet is returned to ring port 26(3R) within a timeout period, it indicates that a communication loop is still present within ring network 20. Accordingly, the loop prevention protocol will continue to block the designated port. It is noted that communication loops could also be detected by sending ring protocol control packets from ring port 26(3R) via link 24(3) and determining whether those ring protocol control packets are returned to ring port 26(3L) within a timeout period. (In RRR, a blocked ring port can still send and receive ring control packets.)

If instead a ring protocol control packet is not returned to within the timeout period, the RRR protocol detects that the communication loop that was previously present within ring network 20 may no longer exist. However, the failure to return the ring protocol control packet within the timeout period could also be a result of a failure that only affects the control plane. In order to determine whether a data loop is still present, the RRR protocol will send a special data packet around the loop (e.g., by sending the data packet from designated port 26(3L) to ring port 26(3R) via link 24(2), or by sending the data packet from ring port 26(3R) to designated port 26(3L) via link 24(3). Once the special data packet is sent from network node 22(3), the RRR protocol initiates a timeout period (e.g., by starting a timer). If the data packet is received by network node 22(3) before the expiration of the timeout period (e.g., before the timer reaches a specified value), the RRR protocol determines that a communication loop is still present within ring network 20. Since a communication loop is still present, the RRR protocol will continue to block the designated port. If the special data packet is not received within the timeout period, the RRR protocol can safely decide that a data loop is indeed not present and the designated port 26(3L) will be unblocked. In embodiments in which the time needed for a data packet to traverse the ring is relatively short, the timeout period can be just a few milliseconds.

As noted above, when blocked, the designated port is typically not able to send and receive data traffic. Being blocked simply means that the designated port is in a particular logical state in which incoming and outgoing packets are dropped. In order to allow the designated port to send and/or receive the data packet that is used to check for a data loop, the RRR protocol can, for example, create a temporary forwarding table entry corresponding to the special data packet. This forwarding table entry will establish a situation in which the special packet can be sent or received by the blocked port without being dropped. For example, the RRR protocol can create a forwarding table entry indicating that a packet addressed to another ring port of the same network device should be forwarded from the designated port. The RRR protocol will then generate a special data packet addressed to the other ring port. The forwarding engine within the network node will then send that data packet from the designated port, based on the forwarding table entry. The RRR protocol then monitors the other ring port to detect whether the data packet successfully circumnavigates the network. Once the data packet has been received (or timeout period for receiving the data packet has expired), the RRR protocol can remove the temporary forwarding table entry.

Figure 3:
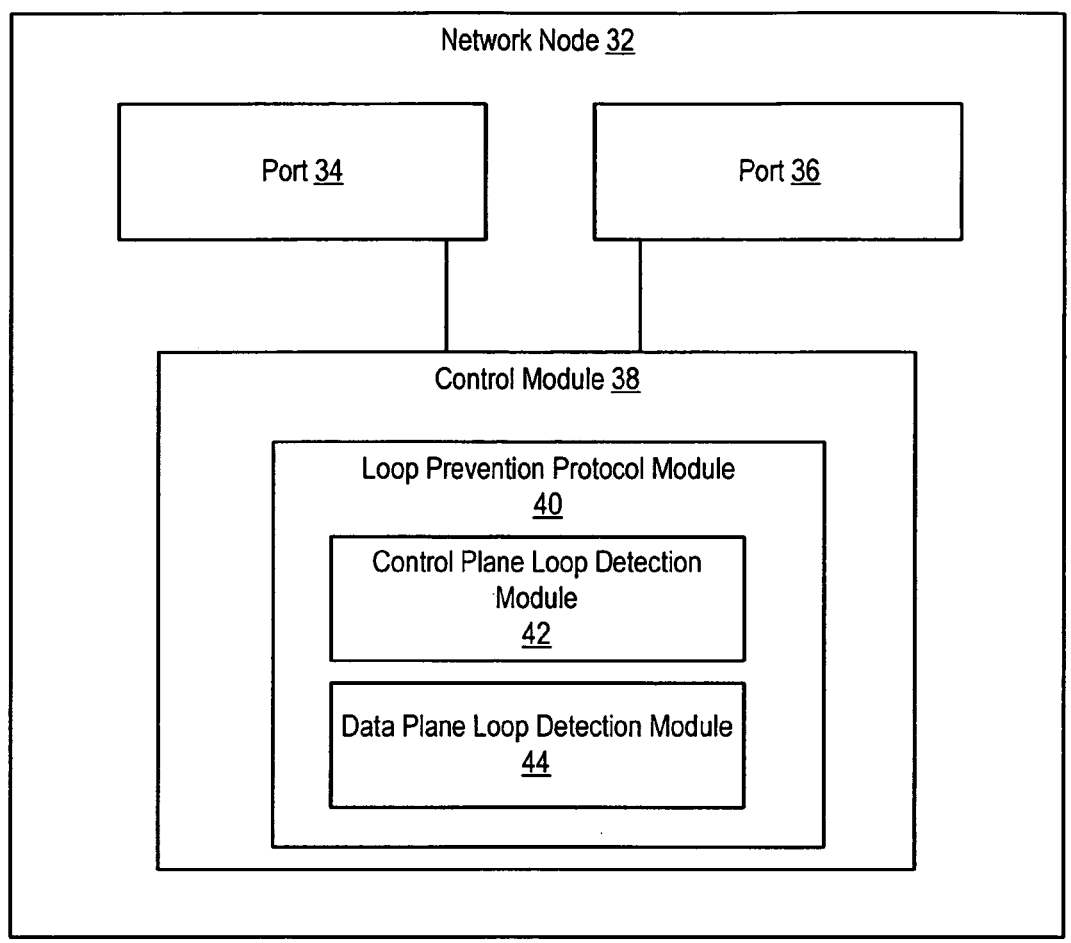
FIG. 3 is a block diagram of a network node that is configured to check for a data plane loop in response to a control plane disruption, according to one embodiment of the present invention.

FIG. 3 shows a block diagram of a network node 32. As shown, network node 32 (e.g., one of network nodes 12(1)-12(5) of FIG. 1 or network nodes 22(1)-22(4) of FIG. 2) includes ports 34 and 36 as well as a control module 38, which in turn includes a loop prevention protocol module 40.

Control module 38 can include forwarding and/or routing functionality. Control module 38 includes loop prevention module 40, which instantiates one or more instances of a protocol (such as a spanning tree protocol or RRR) in order to prevent communication loops. In some embodiments, there is one spanning tree instance per virtual local area network (VLAN). Control module 38 can be implemented in hardware, software, or a combination of hardware and software (e.g., all or part of control module 38 can be implemented in software that is executed by one or more processors within network node 32).

Ports 34 and 36 are configured to send and receive packets. In one embodiment, ports 34 and 36 are configured as ring ports. Ports 34 and 36 can be logical or physical ports. For example, port 34 can be an aggregated port that includes several physical ports (aggregation can be provided by a protocol such as Link Aggregation Control Protocol (LACP) or Port Aggregation Protocol (PAgP)).

Loop prevention module 40 can send control and data packets via ports 34 and 36 in order to detect the presence or absence of communication loops within a network that includes network node 32. Loop prevention module 40 can also block and unblock one or more of ports 34 and 36. For example, loop prevention module 40 can update state information associated with the port to be blocked or unblocked, and this state information can in turn control how forwarding and routing decisions are made within network node 32. Loop prevention module 40 can temporarily unblock a blocked port (e.g., by creating a temporary forwarding table entry, as described above) when sending a special data packet to detect a communication loop.

When loop prevention module 40 detects a loop within a network topology, loop prevention module 40 selects a port to block in order to break the loop. In some embodiments, the port (if any, within network node 32) to block is selected by communicating with loop prevention modules in other network nodes.

When a control packet is received by one of ports 34 and 36, the receiving port notifies control module 38. This causes the control module to process the control packet. For example, if a loop prevention protocol control packet indicating a data loop is received, control module 38 can provide the control packet to loop prevention protocol module 40. Loop prevention protocol module 40 can then process the packet in order to determine whether a loop is present or absent, as well as whether to block or unblock a port.

Loop prevention protocol module 40 includes a control plane loop detection module 42 and a data plane loop detection module 44. Control plane loop detection module 42 is configured to use control packets to detect the presence or absence of a communication loop. For example, control plane loop detection module 42 can cause a control packet to be sent from network node 32 around a previously detected loop. If the control packet is returned to network node 32 within a timeout period, control plane loop detection module 42 determines that the loop is still present. If not, control plane loop detection module 42 determines that the loop is no longer present, at least with respect to the control plane.

If control plane loop detection module 42 determines that a previously-detected loop is no longer present, data plane loop detection module 44 will send a special data packet from network node 32 via the previously-detected loop in order to determine whether the loop is still present in the data plane. If the data packet is received by network node 32 within the timeout period, data plane loop detection module 44 will prevent loop prevention module 40 from unblocking a port, since the loop is still present. If the special data packet is not received by network node 32 within the timeout period, data plane loop detection module 44 will allow loop prevention module 40 to unblock the port, since the loop is no longer present in either the control or data plane.

As noted above, in some embodiments, the loop prevention protocol is RRR. In such an embodiment, ports 34 and 36 can be ring ports. In RRR, there are several types of ring protocol control packets, including fail packets, heal packets, loop complete packets, and loop broken packets. Receipt of one of these packets can cause loop prevention protocol module 40 to detect the presence or absence of a loop. If loop prevention protocol module 40 detects the absence of a loop, data plane loop prevention module 44 will cause a data packet to be sent around the loop (e.g., by temporarily configuring the designated port so that the special data packet can be sent to or from the designated port) in order to confirm the absence of the loop.

Fail packets are generated when a ring port detects that a link has gone down. The ring port that detects the failure generates a fail packet and sends the fail packet to a paired port. The paired port is either within the same network node as or directly coupled to the ring port that detects the failed link. When a network node receives a fail packet, that node floods the fail packet to the paired ring port in the same ring as the receiving ring port. Use of fail packets allows ring ports to detect topology changes within the ring and react appropriately.

Heal packets are generated as a pair of ring protocol control packets, such that each heal packet is sent in opposite directions on the ring network. When a network node receives a heal packet, that node floods the heal packet from the ring port in the same ring as the receiving ring port. When a ring port transitions from a failed state to a non-failed state and consequently generates a heal packet, a new data path may be created. This may create a temporary loop.

Loop complete packets are originated by the designated port and sent to both the paired port (within the same network node as the designated port) and the link coupled to the designated port. These packets are used to detect whether there is a loop in the ring network. These packets are also used to elect a designated port and to identify whether the elected designated port is currently blocking.

Loop broken packets are originated by the designated port and sent to both the paired port and the link. These packets are used to detect whether a loop has been restored, to elect a designated port, and to acknowledge receipt of a fail packet.

Figure 4:
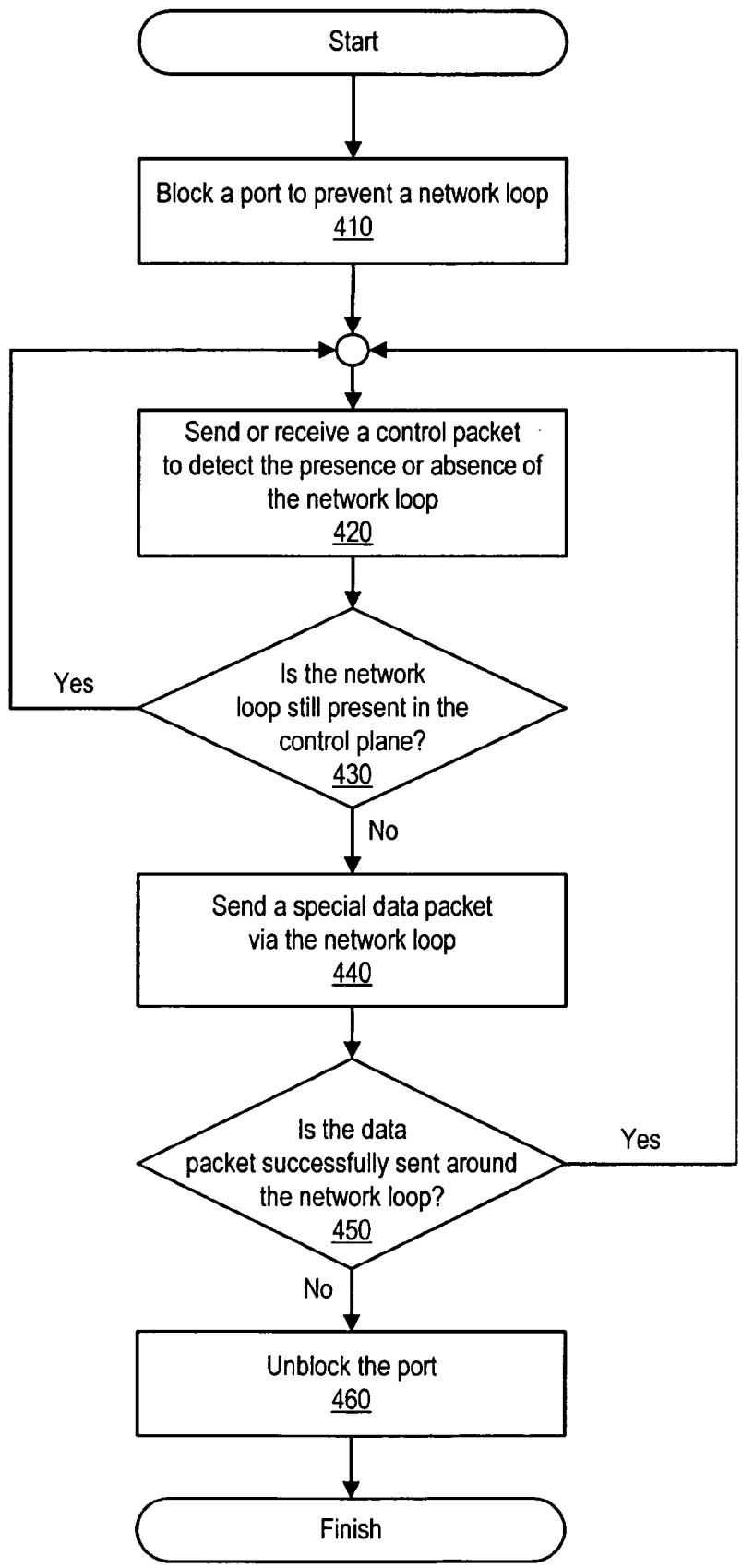
FIG. 4 is a flowchart of a method of checking for a data loop in response to detecting a control plane disruption, according to one embodiment of the present invention.

FIG. 4 is a flowchart of a method of checking for a data loop in response to detecting a control plane disruption. This method can be performed by a control module (e.g., control module 38 of FIG. 3), which can include one or more forwarding engines (such forwarding engines can be distributed among several line cards) and/or route processors. The control module instantiates one or more instances of a loop prevention protocol.

The method begins at 410, when the control module blocks a port in order to prevent a network loop. As noted above, a blocked port is in a logical state in which the port cannot send or receive data packets. Any data packets sent to the blocked port will be dropped.

At 420, the control module sends or receives a control packet in order to detect the presence or absence of the network loop. For example, in a ring network implementing RRR, the control module (within the network node that includes the designated port) can send a control packet from the designated port to the other ring port within the same network node as the designated port. If the control packet is received at the other ring port before the expiration of a timeout period, the control module determines that the network loop is still present. As another example, the control module can receive a fail or heal packet, which respectively indicate that a network loop may be absent or present. In a non-ring network, the control module can send one or more BPDUs in order to detect the presence or absence of a network loop.

Based on the control packet sent or received at 420, the control module determines whether the network loop is still present in the control plane, as shown at 430. For example, if a control packet was sent around the network loop at 420, the control module determines that the network loop is still present if the control packet successfully circumnavigates the network loop within a timeout period.

If the network loop is no longer present in the control plane (as determined at 430), the control module attempts to send a special data packet via the network loop, as shown at 440. In some embodiments, the control module may temporarily unblock the blocked port for special data packets in order to send and/or receive this data packet.

If the special data packet is successfully sent around the network loop, as detected at 450, the control module determines that the network loop is still present in the data plane. Accordingly, the control module does not unblock the port that was originally blocked at 410. The control module can continue to try to detect the presence or absence of the network loop in the control plane (e.g., by repeating operations 420 and 430) at this point. The control module can additionally generate an error indication (e.g., by logging an error message, causing an error indicator light to light up or blink, by sending an email or instant message to an administrator, or the like) in this situation, since there appears to be a disruption in the control plane but not the data plane.

If the special data packet is not successfully sent around the network loop (as determined at 450), it indicates that the network loop is no longer present in the data plane as well as the control plane. Accordingly, the control module unblocks the port (which was originally blocked at 410), as shown at 460.

Figure 5:
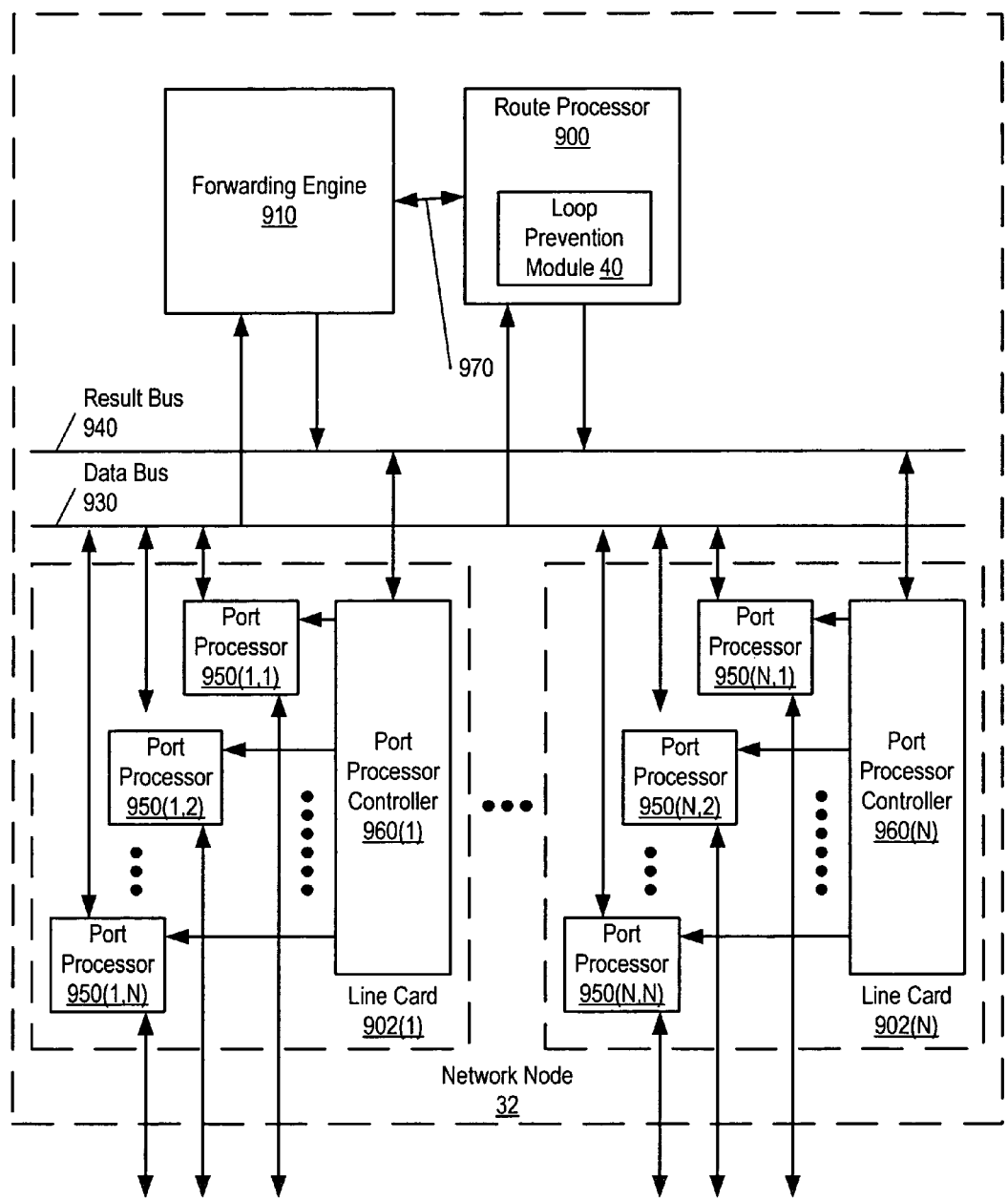
FIG. 5 shows a block diagram of a network node that is configured to check for a data loop in response to a control plane disruption, according to one embodiment of the present invention.

FIG. 5 shows a block diagram of a network node 32 (e.g., network node 32 of FIG. 3). In this depiction, network node 32 includes a number of line cards (line cards 902(1)-902(N)) that are communicatively coupled to a forwarding engine 910 and a route processor 900 via a data bus 930 and a result bus 940. Line cards 902(1)-902(N) include a number of port processors 950(1,1)-950(N,N) which are controlled by port processor controllers 960(1)-960(N). One or more port processors 950(1,1)-950(N,N) can be configured as ring ports by assigning ring identifiers to those port processors. It will also be noted that forwarding engine 910 and route processor 900 are not only coupled to one another via data bus 930 and result bus 940, but are also communicatively coupled to one another by a communications link 970. It is noted that in alternative embodiments, each line card can include a forwarding engine. It is noted that route processor 900 and forwarding engine 910 implement the functionality of the control module 38 shown in FIG. 3. The functionality of loop prevention module 40 can be implemented in route processor 900, as shown in FIG. 5.

When a packet is received, the packet is identified and analyzed by a network device such as network node 32 in the following manner, according to embodiments of the present invention. Upon receipt, a packet (or some or all of its control information) is sent from the one of port processors 950(1, 1)-950(N,N) at which the packet was received to one or more of those devices coupled to data bus 930 (e.g., others of port processors 950(1,1)-950(N,N), forwarding engine 910 and/or route processor 900). Handling of the packet can be determined, for example, by forwarding engine 910. For example, forwarding engine 910 may determine that the packet should be forwarded to one or more of port processors 950(1,1)-950 (N,N). This can be accomplished by indicating to corresponding one(s) of port processor controllers 960(1)-960(N) that the copy of the packet held in the given one(s) of port processors 950(1,1)-950(N,N) should be forwarded to the appropriate one of port processors 950(1,1)-950(N,N).

In the example of FIG. 5, one or more (e.g., a pair) of port processors 950(1,1)-950(N,N) can be blocked by loop prevention module 40. Additionally, port processors 950(1,1)-950(N,N) can send and receive loop prevention protocol control packets as well as special data packets generated by loop prevention module 40 to confirm whether a network loop is present in the data plane. If loop prevention module 40 detects that a network loop is no longer present in the control plane, loop prevention module 40 can send such a special data packet before unblocking any previously-blocked port.

Figure 6:
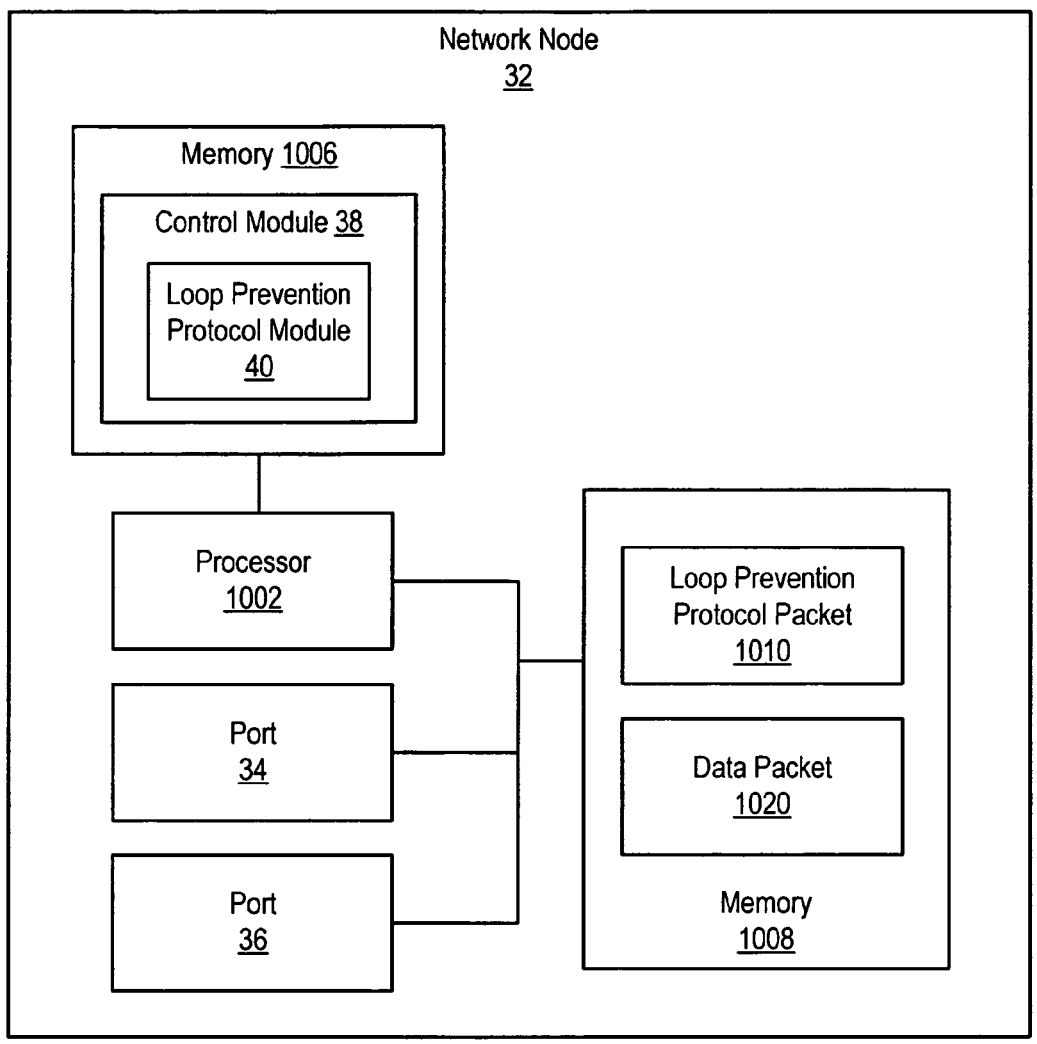
FIG. 6 is a block diagram of a network node that executes software configured to check for data loops in response to control plane disruptions, according to one embodiment of the present invention.

FIG. 6 is another block diagram of network node 32 (e.g., network node 32 of FIG. 3), which illustrates how loop prevention protocol module 40 can be implemented in software. As illustrated, network node 32 includes one or more processors 1002 (e.g., microprocessors, PLDs (Programmable Logic Devices), or ASICs (Application Specific Integrated Circuits)) configured to execute program instructions stored in memory 1006. Memory 1006 can include various types of RAM (Random Access Memory), ROM (Read Only Memory), Flash memory, MEMS (Micro Electro-Mechanical Systems) memory, and the like. Processor 1002 and memory 1006 can be included in a port processor (e.g., port processors 950(1,1)-950(N,N) of FIG. 5), a port processor controller (e.g., port processor controllers 960(1)-960(N) of FIG. 5), a forwarding engine (e.g., forwarding engine 910 of FIG. 5), or a route processor (e.g., route processor 900 of FIG. 5). Processor 1002 and memory 1006 are coupled to send and receive data and control signals by a bus or other interconnect.

Network node 32 also includes several ports, such as ports 34 and 36. Each of these ports can be coupled to another network node via a link. In response to receiving a packet (e.g., such as a loop prevention protocol control packet 1010), ports 34 and 36 can store copies of the received packets in memory 1008. Processor 1002, ports 34 and 36, and memory 1008 are coupled to send and receive data and control signals by a bus or other interconnect.

In this example, program instructions executable to implement control module 38, which includes loop prevention module 40, are stored in memory 1006. The program instructions and data implementing loop prevention protocol module 40 can be stored on various computer readable media such as memory 1006. In some embodiments, such software is stored on a computer readable medium such as a CD (Compact Disc), DVD (Digital Versatile Disc), hard disk, optical disk, tape device, floppy disk, and the like). In order to be executed by processor 1002, the instructions and data implementing loop prevention protocol module 40 are loaded into memory 1006 from the other computer readable medium. The instructions and/or data implementing control module 38 can also be transferred to network node 12(1) for storage in memory 1006 via a network such as the Internet or upon a carrier medium. In some embodiments, a computer readable medium is a carrier medium such as a network and/or a wireless link upon which signals such as electrical, electromagnetic, or digital signals, on which the data and instructions implementing loop prevention protocol module 40 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   in response to detection of a break in a network loop in a control plane of a network, sending a special data packet;
   unblocking a port if the special data packet fails to circumnavigate the network loop in a data plane of the network, wherein
      the port was blocked in response to detection of the network loop in the control plane; and
   preventing the port from being unblocked if the special data packet successfully circumnavigates the network loop in the data plane.

2. The method of claim 1, wherein the blocking the port is performed by an instance of a spanning tree protocol.

3. The method of claim 1, wherein the blocking the port is performed by an instance of a ring protocol.

4. The method of claim 1, wherein the sending the special data packet comprises temporarily configuring the port to send the special data packet from the port.

5. The method of claim 4, wherein the temporarily configuring the port comprises generating a forwarding table entry corresponding to the special data packet.

6. The method of claim 1, further comprising:
   detecting that the special data packet has successfully circumnavigated the network loop in the data plane if a network device receives the special data packet within a timeout period, wherein
      the network device sent the special data packet, and
      the network device comprises the port.

7. A network node comprising:
   a loop prevention module, wherein
      the loop prevention module comprises a control plane loop detection module and a data plane loop detection module, and
      a network comprises the network node; and
   a port coupled to the loop prevention module, wherein
      the loop prevention module is configured to block the port, in response to detection of a network loop in a control plane of the network by the control plane loop detection module,
      the data plane loop detection module is configured to send a special data packet, in response to detection of a break in the network loop in the control plane by the control plane loop detection module,
      the data plane loop detection module is configured to unblock the port if the special data packet fails to circumnavigate the network loop in a data plane of the network, and the data plane loop detection module is configured to prevent the port from being unblocked if the special data packet successfully circumnavigates the network loop in the data plane.

8. The network node of claim 7, wherein the loop prevention module implements a spanning tree protocol.

9. The network node of claim 7, wherein the loop prevention module implements a ring protocol.

10. The network node of claim 7, wherein
the data plane loop detection module is configured to temporarily configure the blocked port to send the special data packet from the port.

11. The network node of claim 10, wherein
the data plane loop detection module is configured to temporarily configure the blocked port by generating a forwarding table entry corresponding to the special data packet.

12. The network node of claim 7, wherein
the data plane loop detection module is configured to detect that the special data packet has successfully circumnavigated the network loop in the data plane if the network node receives the special data packet within a timeout period.

13. The network node of claim 12, wherein
the data plane loop detection module is configured to allow the port to be unblocked if the special data packet fails to circumnavigate the network loop in the data plane within the timeout period.

14. A system comprising:
a network comprising a plurality of network nodes, wherein
   a first network node of the plurality of network nodes comprises a loop prevention module,
   the loop prevention module comprises a control plane loop detection module and a data plane loop detection module, and
   the network comprises the first network node of the plurality of network nodes; and
a port coupled to the loop prevention module, wherein
   the loop prevention module is configured to block the port, in response to detection of a network loop in a control plane of the network by the control plane loop detection module,
   the data plane loop detection module is configured to send a special data packet, in response to detection of a break in the network loop in the control plane by the control plane loop detection module,
   the data plane loop detection module is configured to unblock the port if the special data packet fails to circumnavigate the network loop in a data plane of the network, and
   the data plane loop detection module is configured to prevent the port from being unblocked if the special data packet successfully circumnavigates the network loop in the data plane.

15. A system comprising:
means for blocking a port in response to detection of a network loop in a control plane of a network;
means for detecting a break in the network loop in the control plane;
means for sending a special data packet around the network loop, in response to detection of the break in the network loop in the control plane;
means for unblocking the port, if the special data packet fails to circumnavigate the network loop in a data plane of the network; and
means for preventing the port from being unblocked if the special data packet successfully circumnavigates the network loop in the data plane.

* * * * *